United States Patent [19]

Botimer

[11] Patent Number: 4,674,172
[45] Date of Patent: Jun. 23, 1987

[54] TOOL COUPLING APPARATUS

[76] Inventor: Donald W. Botimer, P.O. Box 175, Frankenmuth, Mich. 48734

[21] Appl. No.: 811,358

[22] Filed: Dec. 20, 1985

[51] Int. Cl.4 .............................................. B23Q 3/157
[52] U.S. Cl. ...................................... 29/568; 271/1.5; 279/1 B; 409/232
[58] Field of Search ....................... 409/232, 233, 234; 29/568, 26 A; 279/1 B, 91; 211/1.5, 69

[56] References Cited

U.S. PATENT DOCUMENTS

| 3,191,260 | 6/1965 | Jorgensen | 211/1.5 X |
| 3,604,565 | 9/1971 | Freeman | 211/69 X |
| 3,658,352 | 4/1972 | Koch et al. | 279/1 B X |
| 3,663,028 | 5/1972 | King, Jr. et al. | 279/1 B X |
| 3,680,436 | 8/1972 | Marsland | 279/1 B X |
| 3,684,101 | 8/1972 | Bradford et al. | 211/1.5 |
| 3,747,946 | 7/1973 | Edens | 279/1 B X |
| 3,907,312 | 9/1975 | Fletcher et al. | 279/1 B X |
| 3,973,863 | 8/1976 | Smith | 29/568 X |
| 4,499,650 | 2/1985 | Cannon et al. | 29/568 |

Primary Examiner—Gil Weidenfeld
Assistant Examiner—Glenn L. Webb
Attorney, Agent, or Firm—Learman & McCulloch

[57] ABSTRACT

Apparatus for coupling a tool to a rotating spindle comprises a support in which the tool may be accommodated in a position to be fitted into a spindle cavity. Engagement between the rotating spindle and the tool imparts rotation to the latter. The tool is subjected to a subsequent retardation to effect relative rotation between the tool and the spindle in such manner as to actuate a latch and secure the tool to the spindle.

17 Claims, 4 Drawing Figures

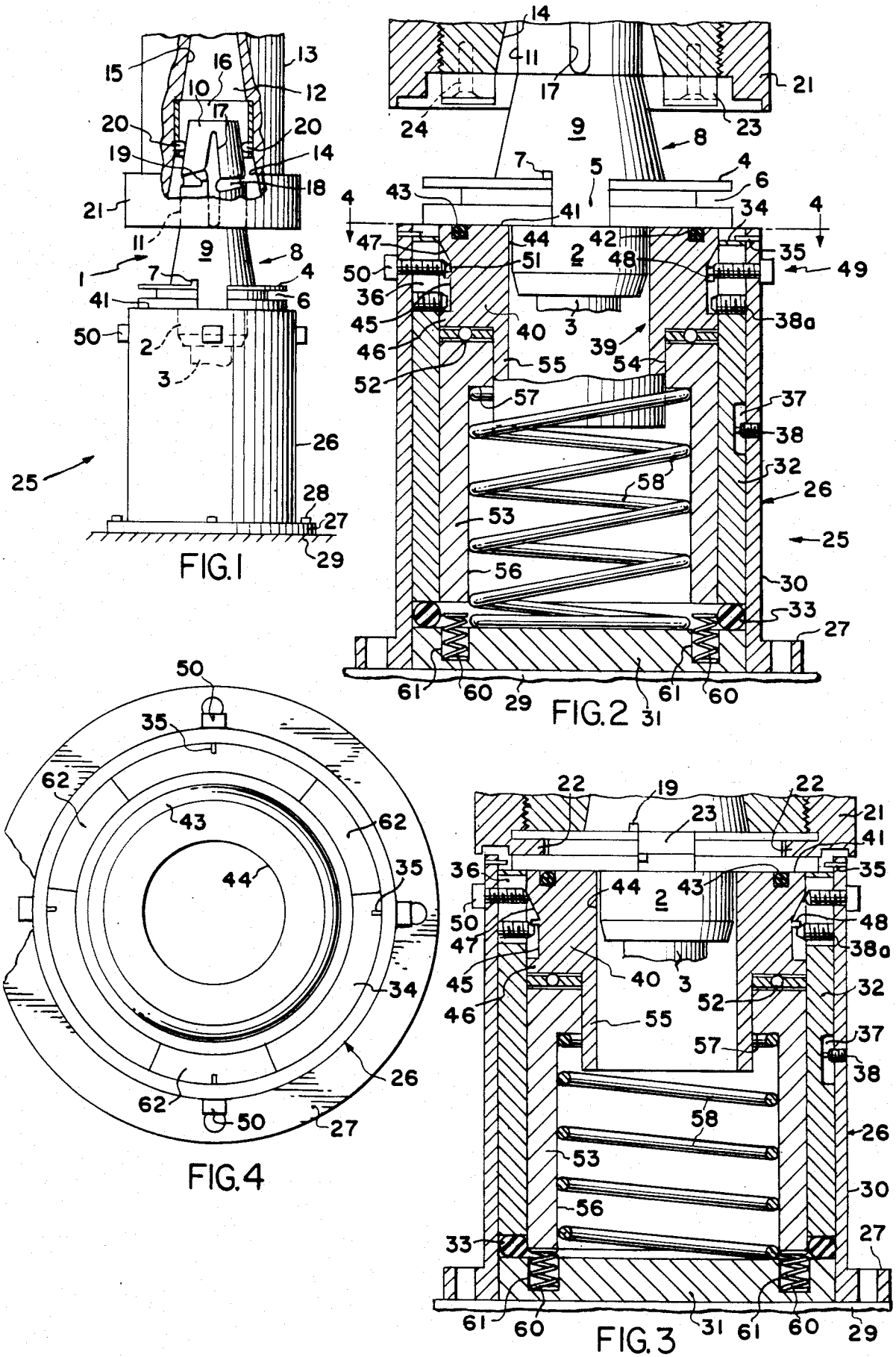

4,674,172

TOOL COUPLING APPARATUS

This invention relates to apparatus for use in the coupling and uncoupling of a tool to and from a rotating spindle without necessitating stopping of the spindle.

BACKGROUND OF THE INVENTION

The prior art contains numerous examples of tool holders wherein a tool is capable of being coupled to and uncoupled from a rotary spindle without necessarily stopping rotation of the spindle. Tool holders of the general class with which the invention is adapted for use are disclosed in Nickless U.S. Pat. No. 2,719,722; King et al. U.S. Pat. No. 3,663,028; Koch U.S. Pat. No. 3,829,109; and Botimer U.S. Pat. No. 3,512,793.

One of the disadvantages of changing tools supported in rotating tool holders of the known kind is that the changing of a tool necessiates manual gripping by the operator of some part of the rotating members. It thus is possible for the operator to be injured.

Another disadvantage of known tool holders is that the tool that is to be coupled to a rotating spindle is required to be supported as it is introduced to the spindle cavity, and such support usually is accomplished manually. Unless the tool is perfectly aligned coaxially with the spindle as the tool is introduced into the spindle cavity the tool may be subjected to a whipping action, thereby again exposing the operator to the possibility to injury.

In those tool holders wherein the rotary spindle is slowed or stopped prior to coupling or uncoupling of a tool to or from the spindle, it is customary to provide a spindle braking mechanism which not only represents an additional initial expense, but also requires servicing and maintenance.

An object of the present invention is to provide a support for a tool which enables the latter to be coupled to and uncoupled from a rotary spindle without necessitating slowing or stopping of the latter and which avoids the necessity of an operator's manually engaging either the tool or the spindle.

SUMMARY OF THE INVENTION

Apparatus constructed in accordance with the invention comprises a housing within which is a rotor capable of rotation about a vertical axis, as well as axial movements between raised and lowered positions. The rotor has an opening therein for the loose accommodation of a tool or tool adapter to be coupled to and uncoupled from a rotary spindle. Axial movements of the rotor are limited by appropriate stops. In its raised position the rotor is freely rotatable, but as it moves to its lowered position, it is acted upon by retarding means which applies a braking force on the rotor. The upper surface of the rotor is engageable by the tool and preferably is equipped with a friction tread which assists in accelerating rotation of the rotor to a speed corresponding to that of the spindle. Such tread also assists in the application of a rotary retarding force on the tool when rotation of the rotor is retarded.

THE DRAWINGS

A preferred embodiment of the invention is disclosed in the following description and in the accompanying drawings, wherein:

FIG. 1 is an elevational view, with parts cut away, illustrating a tool accommodated in a support and in the process of being coupled to a rotary spindle;

FIG. 2 is a sectional view, on a greatly enlarged scale, of the apparatus shown in in FIG. 1;

FIG. 3 is a view similar to FIG. 2, but illustrating the spindle in angularly adjusted position and the tool in coupled relation with the spindle; and FIG. 4 is a fragmentary, top plan view of the support taken on the line 4—4 of FIG. 2.

THE PREFERRED EMBODIMENT

Apparatus constructed in accordance with the invention is adapted for use in conjunction with a tool or adapter 1 of known kind having at one end a cylindrical stem 2 provided with a central bore in which one end of a cutting bit 3 or the like is fitted. Adjacent the cylindrical stem is a peripheral flange 4 having a pair of diametrally opposed axial recesses 5 and a circumferential helical groove 6 therein. The flange 4 has an upstanding lug 7 adjacent one side of each of the recesses 5.

As used herein the term tool is intended to refer to any kind of tool having a peripheral flange between its ends and a shank at one end that can be accommodated in an axial cavity in a rotary spindle. The term also is intended to refer to an adapter of the kind shown which is itself accommodated in the spindle and supports a cutting tool.

Extending axially from the flange 4 is a shank 8 having spaced apart tapered sections 9 and 10 spaced by a cylindrical section 11. The shank 8 is adapted to be accommodated in a cavity 12 formed in a rotary spindle 13, the cavity having tapered portions 14 and 15 spaced by an annular, cylindrical bushing 16. The tapered sections 9 and 10 of the shank are adapted to seat on the surfaces 14 and 15, respectively, and the section 11 is adapted to confront the bushing 16 with a small clearance therebetween.

The shank 8 has two diametrically opposed, axially extending grooves 17 in alignment with the respective recesses 5. In communication with the grooves 17 is a helical groove 18 having a lip 19 adjacent each axial groove 17. The depth of the groove 18 is about 0.025 inch less than that of the grooves 17 at the lip 19 and then matches the depth of the grooves 17 for a purpose presently to be explained.

The spindle 13 is provided with spring pressed pins 20 which project radially inwardly of the bushing 16 and are of such size at their free ends as to be accommodated in the grooves 17 and 18. The pins cooperate with the grooves to impart rotation of the rotating spindle to the tool 1 and assist in seating the shank 8 in the spindle cavity 11 in the manner described in the aforementioned Botimer patent.

The tool holder 1 may be retained in the spindle 13 in a number of conventional ways. For example, the upper end of the shank 8 could be provided with a knuckle for engagement by and disengagement from a power drawbar (not shown) that extends through a bore in the spindle 13. In the form shown, however, the tool 1 is maintained in removable assembly with the spindle 13 by a rotary lock nut 21 threaded onto the lower end of the spindle and having a pair of radially inwardly projecting latches or lugs 22 (FIG. 3) capable of entering the notches 5 in the flange 4 for accommodation in the groove 6. The lock nut 21 may be rotated automatically to tool latching position by a spring in the manner similar to that disclosed in the aforementioned Botimer patent or the lock nut may be rotated by electrically operated pulsing means of conventional construction. In any case, means of a conventional kind is provided for removably retaining the member 1 in the spindle 13.

The driving engagement between the spindle and the tool is effected by means of keys or lugs 23 secured to the spindle by screws 24 or the like and which are of such size and are so spaced as to be accommodated in the respective notches 5 as shown in FIG. 3. The driving lugs may correspond to those shown in the aforementioned Nickless and Botimer patents.

A support constructed in accordance with the invention is designated generally by the reference character 25 and comprises a cylindrical housing 26 having a flange 27 that may be secured by bolts 28 or the like to a suitable fixture 29 in a position in which the spindle may be axially aligned with the housing. The housing has a cylindrical wall 30 which encloses a base 31 and is open at the top. Slideably accommodated within the housing is a cylindrical sleeve 32 which has a height less than that of the wall 30. The lower end of the sleeve 32 terminates short of the base 31 and rests upon suitable spring means such as a resiliently deformable O-ring 33 made of rubber or rubbery material. The upper end 34 of the sleeve terminates short of the upper end of the housing wall 30 and engages circumferentially spaced pins 35. Adjacent its upper end the sleeve 32 is provided with a plurality of axially extending slots 36 and between its ends the sleeve 32 is provided with an axially extending recess 37. A guide pin 38 carried by the housing wall 30 projects into the recess 37 so as to permit axial movement of the sleeve 32 while restaining rotation thereof. Other pins 38a are threaded into openings formed in the sleeve 32 and project inwardly of the latter for a purpose presently to be described.

Rotatably accommodated in the sleeve 32 adjacent the upper end thereof is a rotor 39 having an annular body 40 the upper surface 41 of which is provided with an upwardly open groove 42 that accommodates a deformable clutch or O-ring 43 formed of rubbery material having a high coefficient of friction. The body 40 has a central bore 44 of such diameter as freely to accommodate the stem 2 of the tool 1. The outer periphery of the body has a circumferential groove 45 terminating at its lower end in a radially projecting flange 46 which underlies the inner ends of the pins 38a. The upper end of the groove 45 is formed as a tapered or inclined surface 47. Between the surface 47 and the flange 46 is a circumferential flange 48 which overlies the pins 38a and performs a movement limiting function as will be explained hereinafter.

Threadedly accommodated in the housing wall 26 and extending into the grooves 36 in the sleeve 32 is a plurality of retarding devices 49 each of which comprises a threaded body 50 within which is a spring pressed pin 51. In the inactive condition of the apparatus each pin clears the peripheral surface of the groove 45 and lies just above the flange 48, the upper movement of which is limited by engagement of the inner ends of the pins 38a with the flange 46.

The rotor body 40 rests atop a bearing 52 that is sandwiched between the body 40 and an annular member 53 having a bore 54 in which a stabilizing extension 55 of the body is rotatably accommodated. The member 53 is counterbored as at 56 to form a shoulder 57 against which one end of a compression spring 58 seats. The opposite end of the spring seats on the base 31.

The base 31 supports a plurality of circumferentially spaced springs 60 seated in cavities 61 in register with the annular member 53. The height of the springs 60 is such that, in the inactive position of the rotor, they do not engage the member 53. When the rotor is depressed, however, the springs 60 are engaged and compressed by the member 53.

To condition the apparatus for insertion of the tool 1 in the spindle cavity, the tool has its stem 2 and bit 3 accommodated in the bore 44 of the rotor 39 so that the lower surface of the flange 4 bears upon the ring 43 in confrontation with the upper surface 41 of the rotor body 40. That surface of the flange 4 which confronts the surface 41 of the rotor body should be normal to the axis of rotation so as to ensure face-to-face engagement between the flange and the confronting parts of the support 1.

When it is desired to couple the tool 1 to the spindle 13, the latter is moved into vertical alignment with the tool shank 8 and lowered so as to enable the shank to be accommodated in the bore 12. As the spindle is lowered, the pin detents 20 will pop into and out of the axial groove 17, thereby imparting rotation to the tool 1. Rotation also will be imparted to the rotor 39 because of the engagement between the flange 4 and the clutch 43 in the upper surface 41 of the rotor, and such rotation will be enhanced by the frictional characteristics of the clutch. Preferably, the upper surface of the rotor is equipped with circumferentially spaced wear plates 62 formed of bars or other suitable material.

As the spindle 13 continues to be lowered, the spring pressed pins 20 will enter the annular groove 18. Movement of the pins into the groove 18 will result in slight relative rotation between the spindle and the shank. As the shank 8 approaches its seated position, continued downward movement of the spindle 13 will cause downward axial displacement of the rotor body 40 against the force of the springs 58 and 60. Compression of the latter springs results in a more forcible engagement between the flange 4 and the rotor body 40. As the rotor body moves to its lowered position, the tapered surface 47 of the groove 45 will bear against the spring pressed pins 51 of the retarding devices 49 and cause the latter to move radially outwardly against an increasing compressive force exerted by the respective pins.

When the clearance between the lower surface of the flange 4 and the upper end 34 of the sleeve 32 is taken up, as shown in FIG. 3, engagement between the flange 4 and the end 34 will exert a further retarding or braking force on rotation of the tool, thereby ensuring relative rotation between the spindle and the tool and alignment of the driving lugs 23 with the slots 5. The ever increasing compressive forces thus applied to the rotor body 40 will have a braking effect thereon, thereby enabling the rotor to impart to the tool a rotary retarding force sufficient to cause relative rotary movement between the tool and the spindle and enable movement of the latching lugs 22 into the annular groove 6 and securely couple the tool 1 to the spindle 13. In this position of the tool the pin detents 20 will occupy the axial grooves 17.

Excessive downward movement of the rotor 39 is precluded by the springs 60 and by the ring 33 between the base 31 and the sleeve 32. As is shown in FIG. 3, the member 53 also is moved downwardly by the flange of the tool so as to be accommodated within the ring 33, thereby precluding collapse of the ring due to undue deformation thereof.

Following coupling of the tool 1 to the spindle, the latter may be raised, thereby withdrawing the tool from the support 25. Expansion of the ring 33 and the springs 58 and 60 results in restoration of the rotor 39 and its associated parts to their raised positions.

To replace the tool 1 in the support 25 the spindle is moved into axial alignment with the rotor and lowered so as to introduce the tool into the bore of the rotor. Thereafter the locking nut, or other tool retention apparatus, may be actuated to separate the tool from the spindle. The slightly greater depth of the grooves 17 as compared to the depth of the annular groove 18 prevents movement of the pins 20 into the groove 18 during withdrawal of the tool from the spindle.

The disclosed embodiment is representative of a presently preferred form of the invention, but is intended to be illustrative rather than definitive thereof. The invention if defined in the claims.

I claim:

1. Appartus for use in coupling or uncoupling a tool to or from a rotating spindle, said apparatus comprising a housing; a normally stationary rotor for supporting such tool; means mounting said rotor in said housing for rotation about an axis and for movements relative to said housing along an axial path between a lowered position and a raised position in which said rotor is engageable by said tool, said rotor being rotatable and movable from its raised position toward its lowered position in response to its engagement with said tool; and retarding means carried by said housing and engageable with said rotor in response to movement thereof toward its lowered position to apply a braking force on said rotor.

2. Apparatus according to claim 1 including means biasing said rotor toward its raised position.

3. Apparatus according to claim 1 including limit means in the path of movement of said rotor toward its raised position for limiting the extent of such movement.

4. Apparatus according to claim 3 wherein said limit means comprises a peripheral flange carried by said rotor and stop means carried by said housing in a position to engage said flange.

5. Apparatus according to claim 1 including limit means in the path of movement of said rotor toward its retracted position for limiting the extent of such movement.

6. Apparatus according to claim 5 wherein said limit means comprises a peripheral flange carried by said rotor and stop means carried by said housing in a position to engage said flange.

7. Apparatus according to claim 1 wherein said rotor has an exposed face engageable with said tool; an axially movable sleeve encircling said rotor and engageable by said tool for axial movements relative to said housing; and stop means in the path of movement of said sleeve axially of said housing for limiting the extent of such movement.

8. Apparatus according to claim 7 wherein said stop means is resiliently deformable.

9. Apparatus according to claim 1 including clutch means carried by said rotor for engagement with said tool.

10. Apparatus according to claim 9 wherein said clutch means comprises a member having a high coefficient of friction.

11. Apparatus according to claim 9 wherein said clutch means comprises an annular friction member.

12. Apparatus according to claim 10 wherein said member comprises a ring.

13. Apparatus for use in coupling and uncoupling a tool to or from a vertically movable, rotating spindle, said apparatus comprising a housing; a normally stationary rotor journaled in said housing for rotation about a vertical axis, said rotor having an exposed upper face engageable by said tool; means mounting said rotor for vertical, axially reciprocating movements between raised and lowered positions, said rotor being rotatable and axially movable in response to engagement of said tool with said face; retarding means carried by said housing in the path of movement of said rotor and engageable with the latter in response to movement thereof toward its lowered position for exerting a braking force on said rotor; and yieldable biasing means acting on said rotor for permitting movement thereof toward its lowered position and constantly urging said rotor to its raised position in which said rotor and said retarding means are disengaged.

14. Apparatus according to claim 13 including limit means acting between said housing and said rotor for limiting axial movements thereof.

15. Apparatus according to claim 13 wherein said housing has a bottom and wherein said yieldable biasing means comprises compression spring means reacting between said rotor and the bottom of said housing.

16. Apparatus according to claim 13 wherein said retarding means comprises force applying means extending substantially radially of the axis of rotation of said rotor and in engagement with the rotor at its periphery, said force applying means exerting a substantially radial force on said rotor.

17. Apparatus according to claim 16 wherein the periphery of said rotor is inclined to said axis and in such direction as to cause the force exerted thereon by said force applying means to increase as said rotor moves toward its lowered position.

* * * * *